Aug. 21, 1945. A. R. THOMPSON ET AL 2,383,228
METHOD AND APPARATUS FOR PREPARING ASPARAGUS OR THE LIKE
Filed Jan. 13, 1941 9 Sheets-Sheet 8
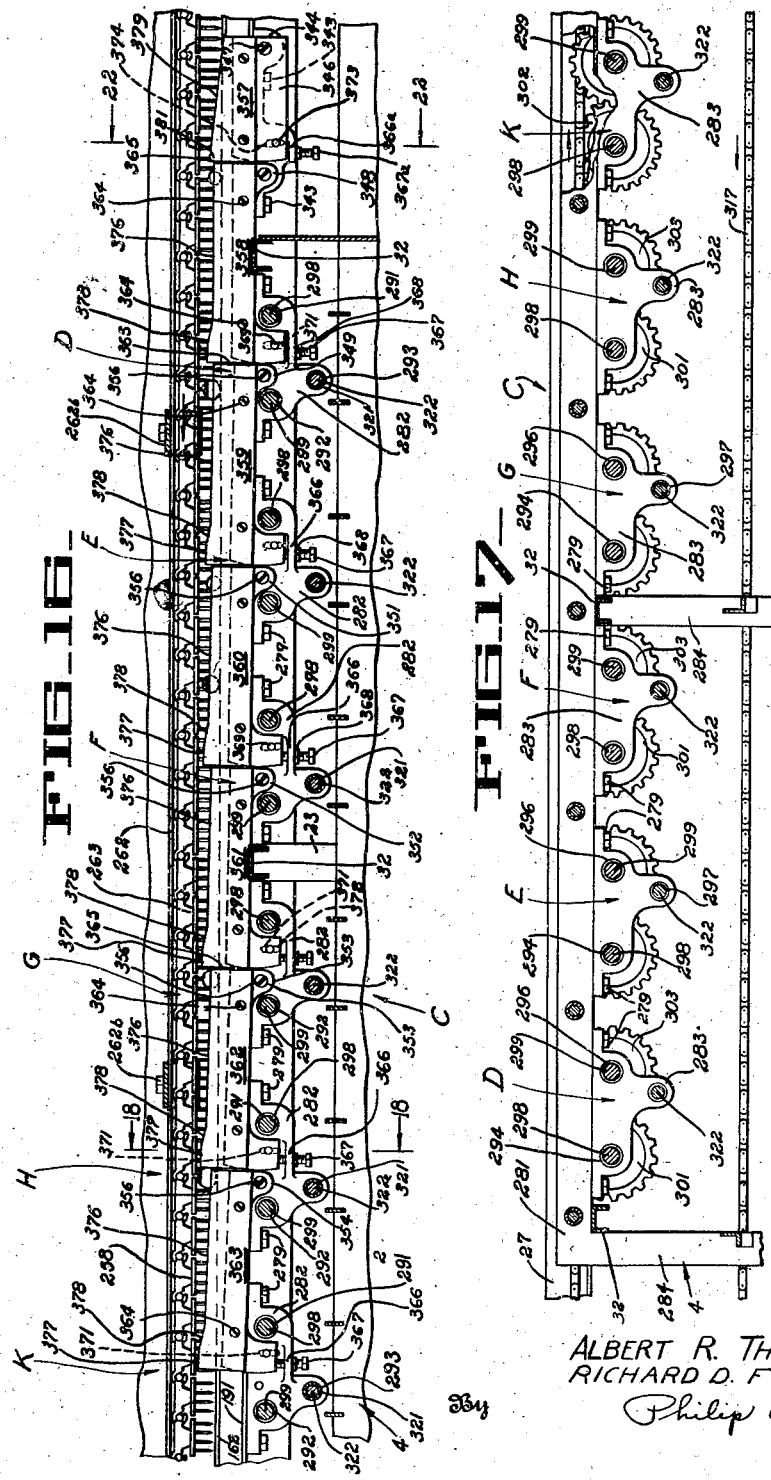
Inventor
ALBERT R. THOMPSON
RICHARD D. FOX
By Philip A. Minnis
Attorney Aug. 21, 1945. A. R. THOMPSON ET AL 2,383,228
METHOD AND APPARATUS FOR PREPARING ASPARAGUS OR THE LIKE
Filed Jan. 13, 1941 9 Sheets-Sheet 9
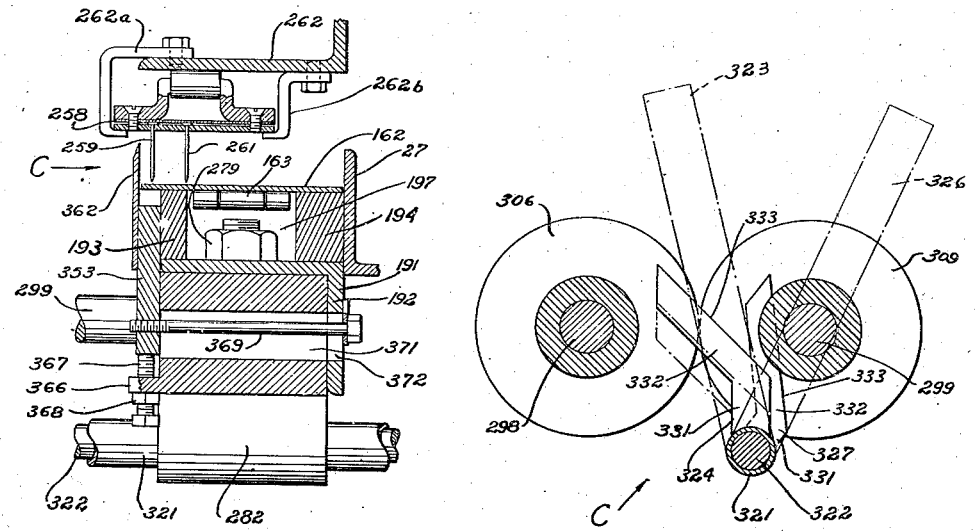
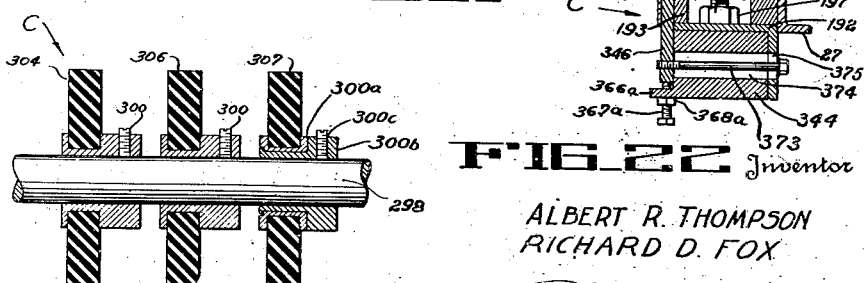
Inventor
ALBERT R. THOMPSON
RICHARD D. FOX
By Philip A. Minnis
Attorney Patented Aug. 21, 1945

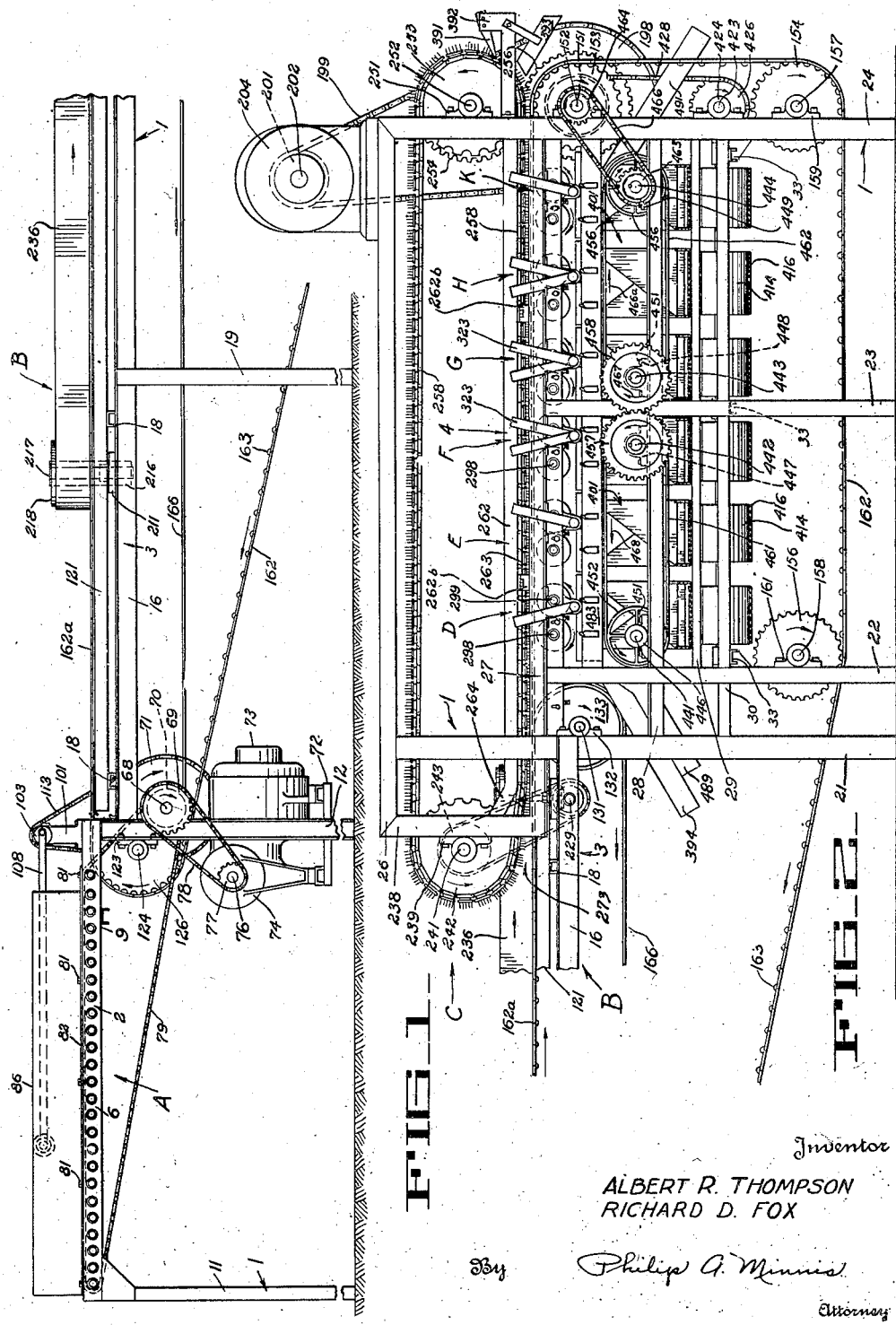

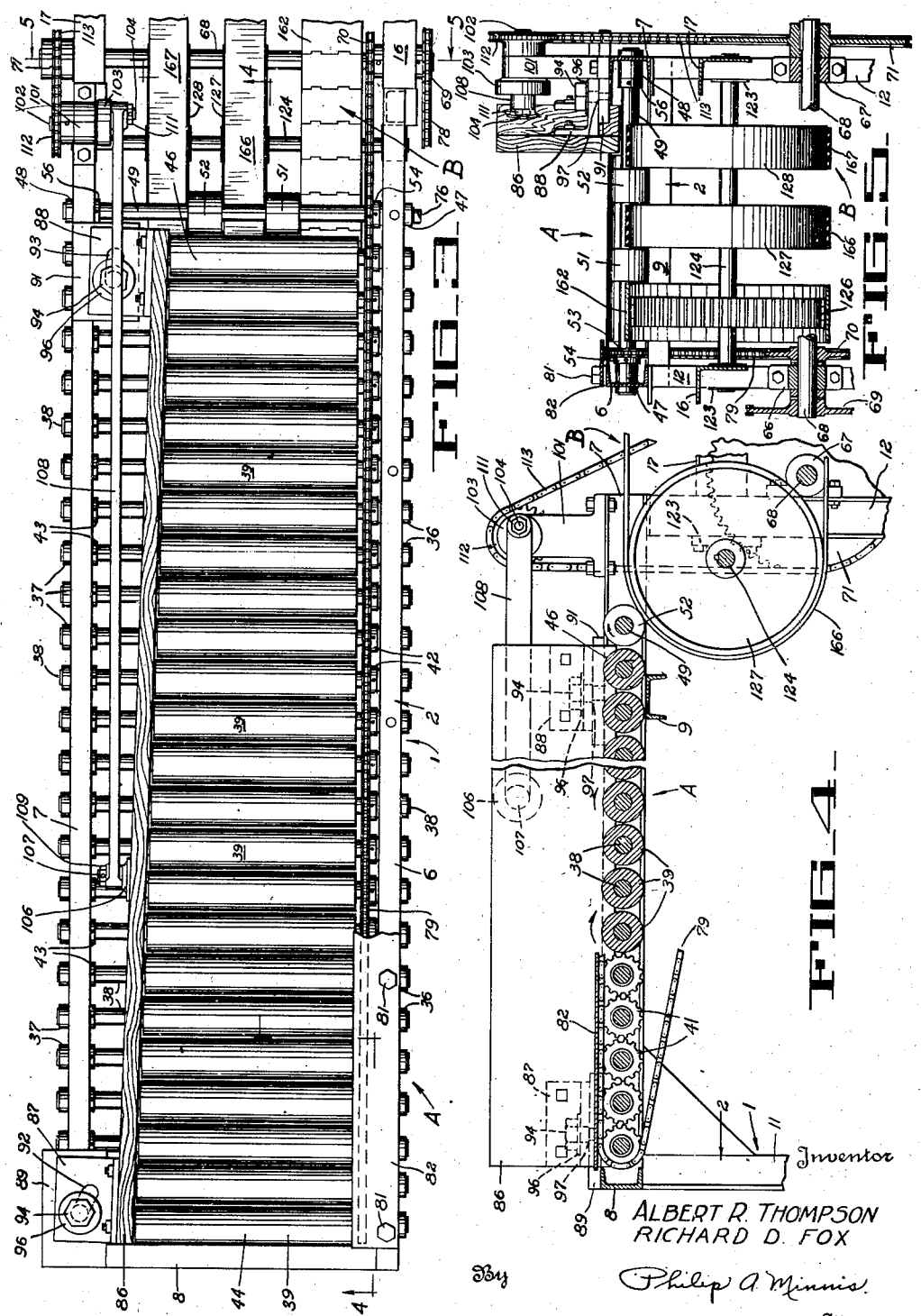

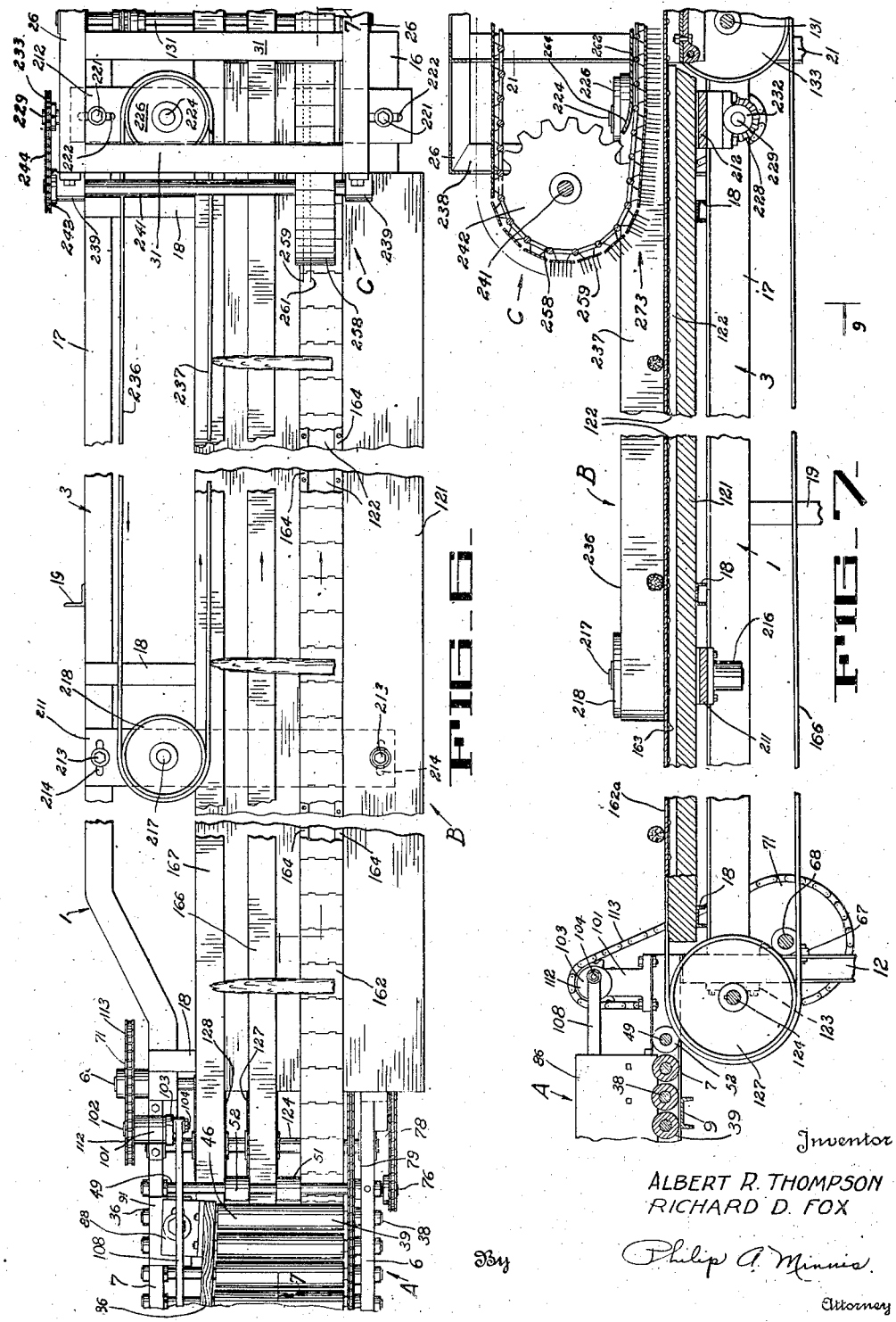

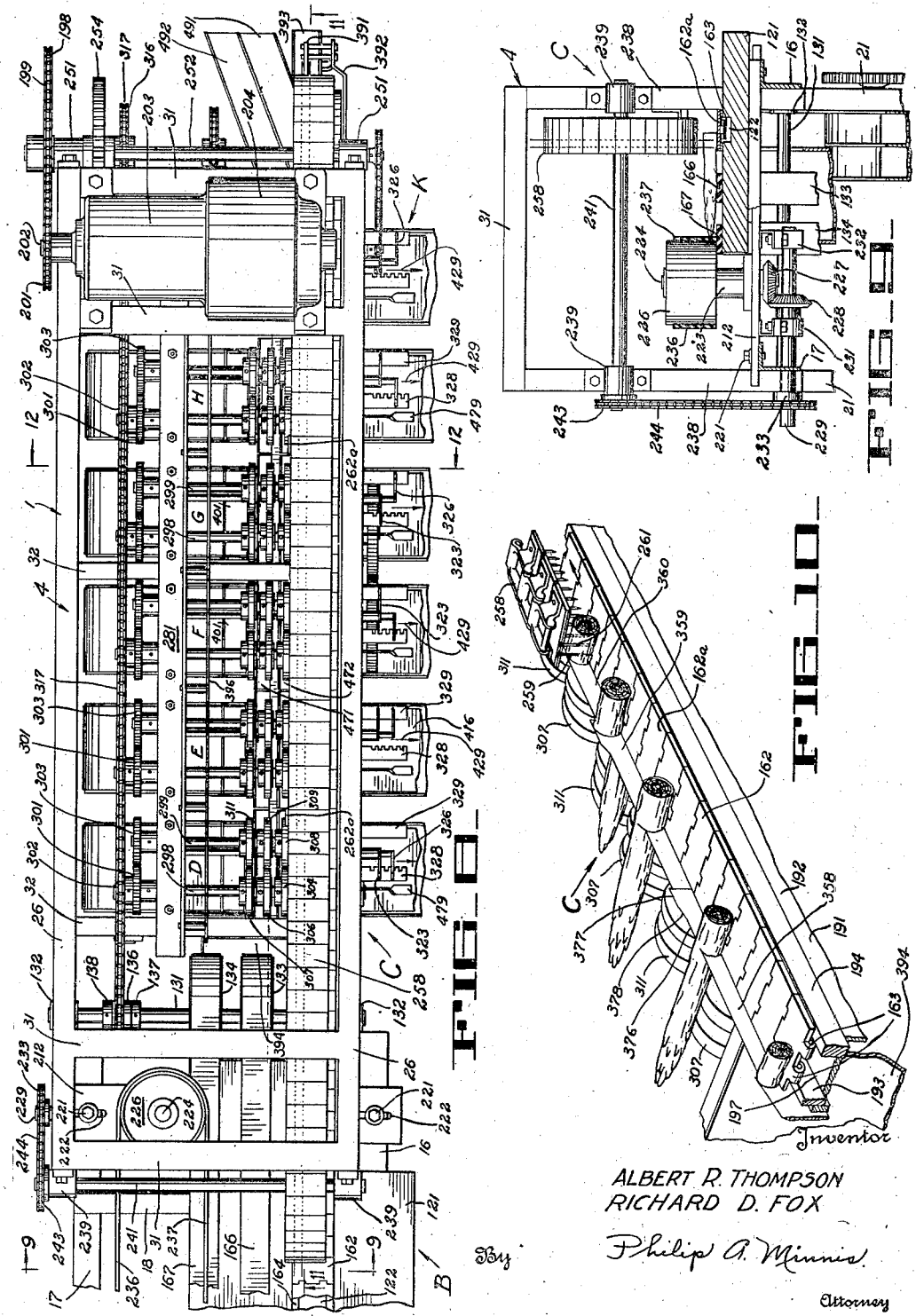

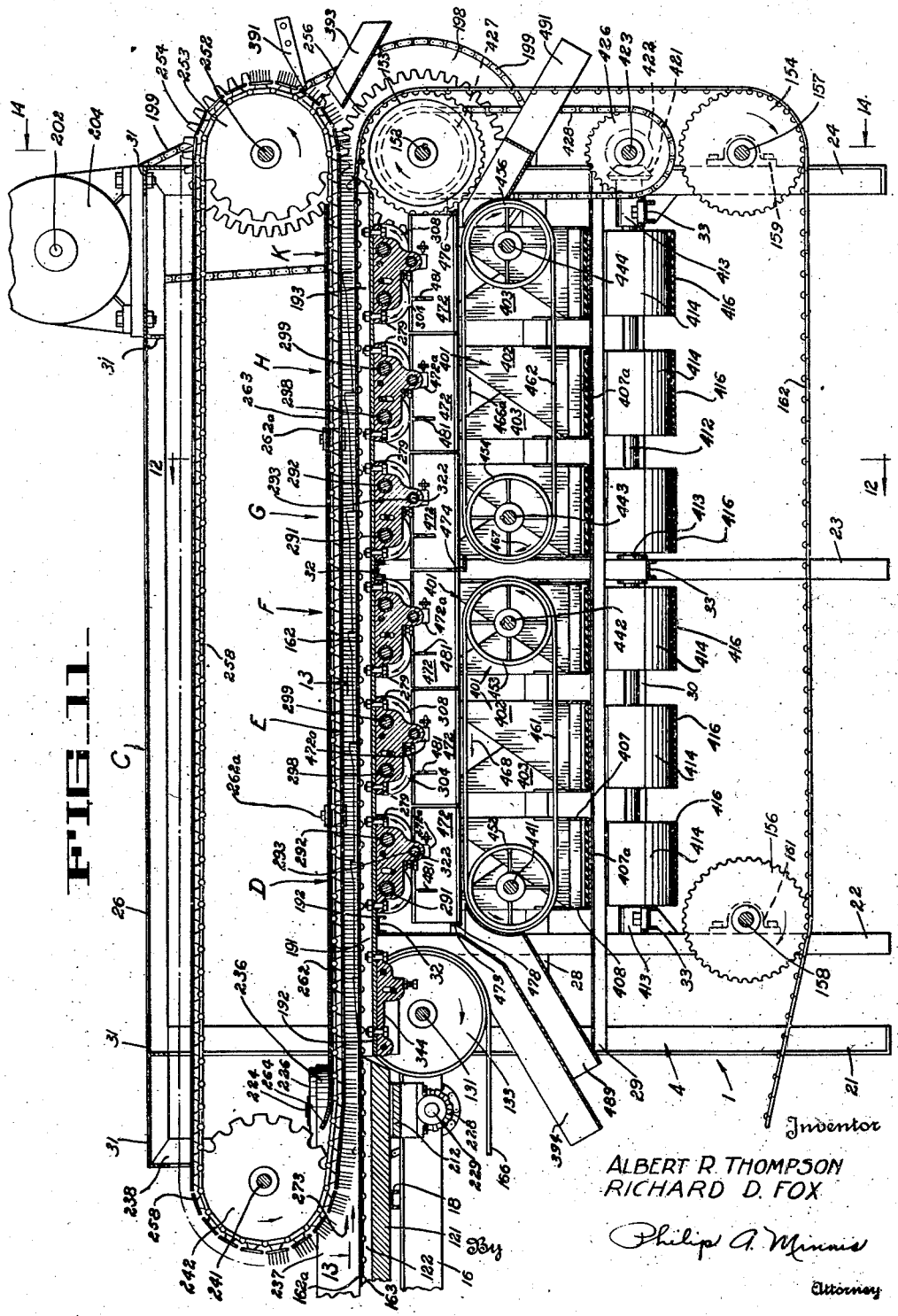

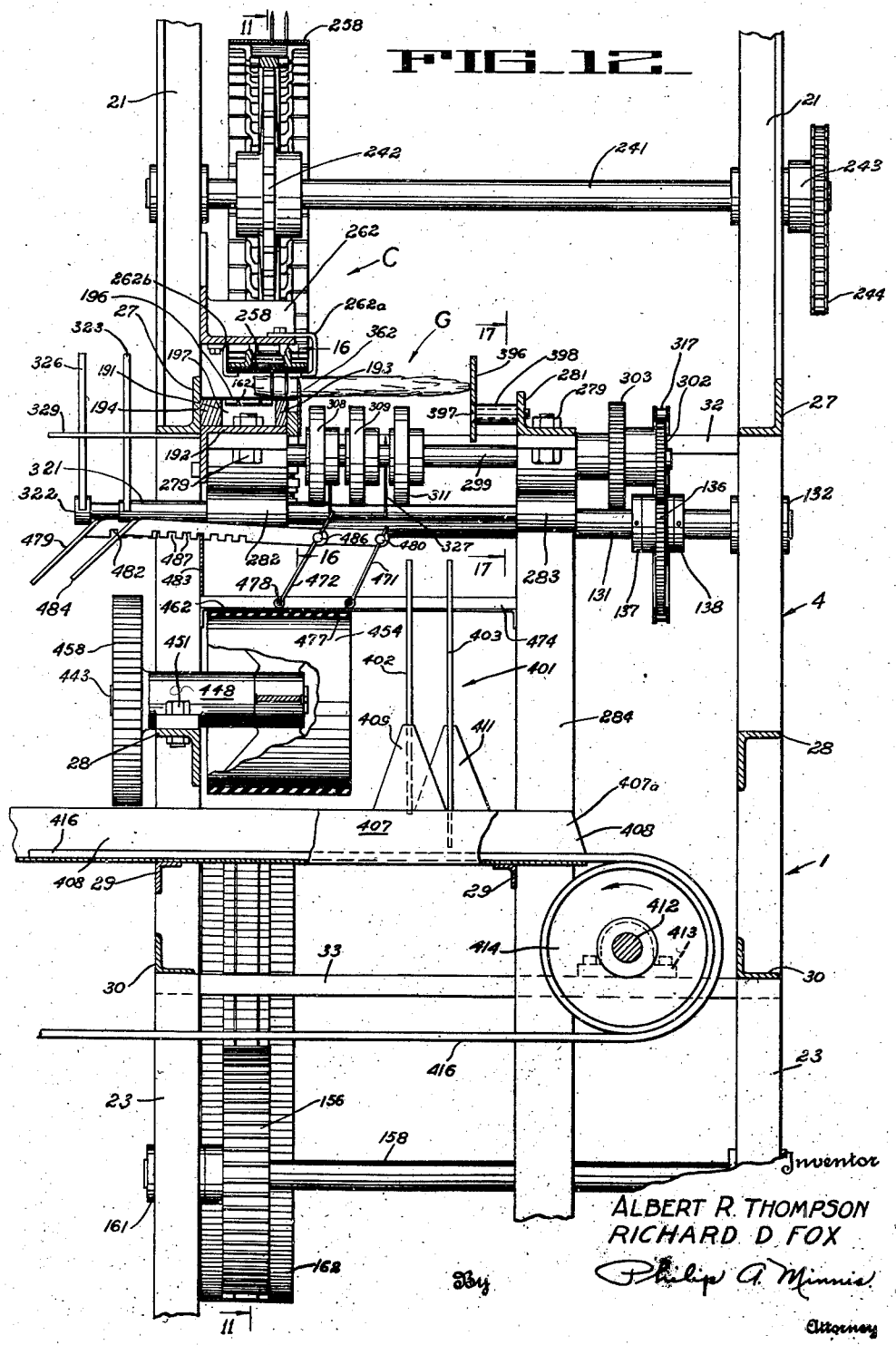

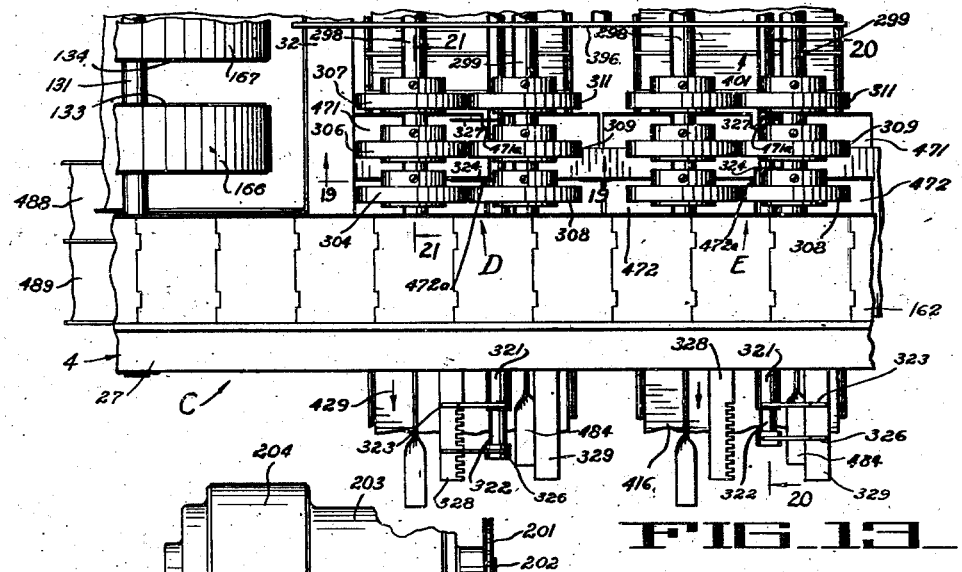
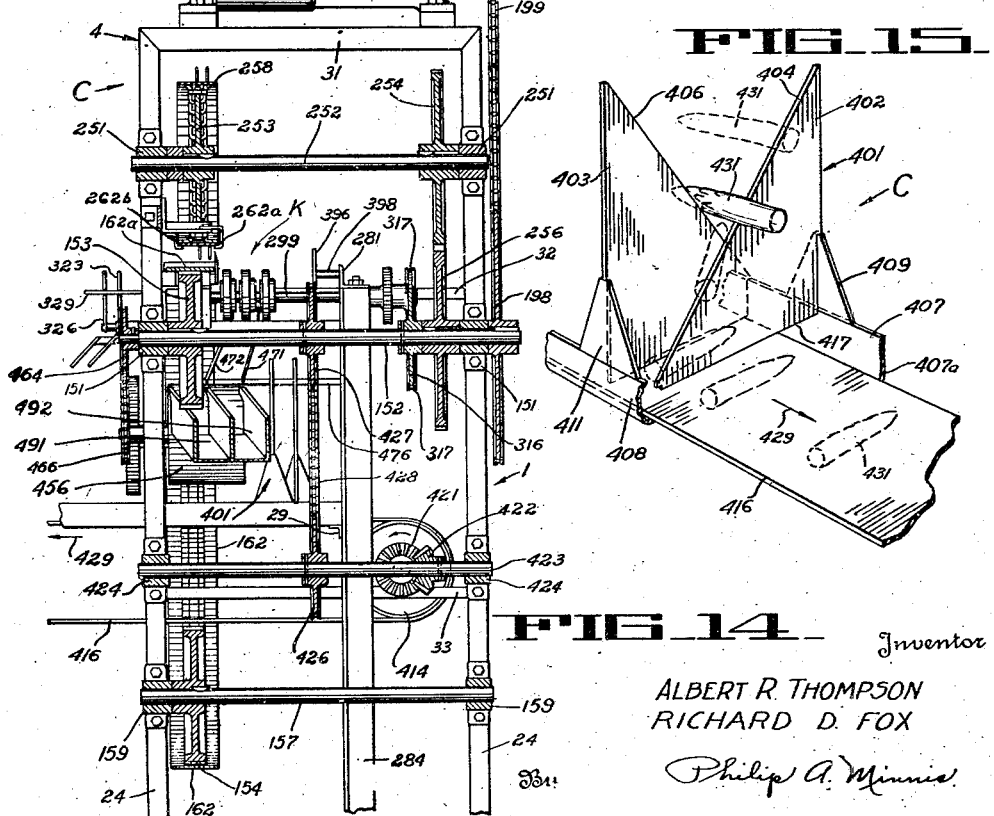

2,383,228

UNITED STATES PATENT OFFICE 2,383,228

METHOD AND APPARATUS FOR PREPARING ASPARAGUS OR THE LIKE

Albert R. Thompson, Los Gatos, and Richard D. Fox, San Jose, Calif., assignors to Food Machinery Corporation, San Jose, Calif., a corporation of Delaware Application January 13, 1941, Serial No. 374,260

38 Claims. (Cl. 146—81)

The present invention relates to a method and apparatus for preparing vegetables such as asparagus or the like previous to canning or other processing of the same.

An object of the present invention is to provide a method of sizing asparagus to separate the same into various grades.

Another object is to provide a method of sizing and cutting asparagus to separate the same into various grades of predetermined thickness and length.

Another object is to provide an improved apparatus for cutting and sizing asparagus or the like in an efficient and speedy manner.

Another object is to provide an apparatus for sizing asparagus to separate the same into various grades and for cutting each grade into sections of predetermined length.

Another object is to provide an apparatus for cutting asparagus and for separating the same into various grades incident to the cutting thereof.

Another object is to provide an apparatus for separating asparagus of different thickness into various grades and for cutting the asparagus into predetermined length incident to the sizing thereof.

Other and further objects and advantages of the present invention will become apparent from the foregoing description taken in connection with the accompanying drawings, in which:

Figs. 1 and 2 are side views of the machine of the present invention. Fig. 2 is the continuation of Fig. 1 at the right hand side thereof.

Fig. 3 is a plan view of a portion of the machine shown in Fig. 1 illustrating the feed table and a portion of the inspection table thereof.

Fig. 4 is a longitudinal section of the feed table taken along lines 4—4 of Fig. 3, certain portions being broken away.

Fig. 5 illustrates a transverse section of Fig. 3 taken along lines 5—5 thereof.

Fig. 6 is a plan view of the inspection table of the machine together with portions of the feed table and the cutting and sizing mechanism thereof, certain portions being broken away.

Fig. 7 is a longitudinal section taken along lines 7—7 of Fig. 6.

Fig. 8 is a plan view of the sizing and cutting mechanism and a portion of the inspection table of the machine.

Fig. 9 is a transverse section taken along lines 9—9 of Fig. 8.

Fig. 10 is a perspective view of a portion of the sizing and cutting mechanism.

Fig. 11 is a longitudinal section of the cutting and sizing mechanism of the machine taken along lines 11—11 of Fig. 8.

Fig. 12 is a transverse section of Fig. 8 taken along lines 12—12 thereof, certain portions being broken away.

Fig. 13 is an enlarged view of a portion of the sizing and cutting mechanism taken along lines 13—13 of Fig. 11.

Fig. 14 is a transverse section taken along lines 14—14 of Fig. 11, certain portions being broken away.

Fig. 15 is a perspective view of one of the turn chutes and its associated parts employed in the machine of the present invention.

Fig. 16 is a longitudinal section of a portion of the cutting and sizing mechanism of the machine, taken along line 16—16 of Fig. 12 and illustrating primarily the construction and arrangement of the grading knives and their associated parts.

Fig. 17 is a section through a portion of the machine taken along lines 17—17 of Fig. 12.

Fig. 18 is a transverse section of the portion of the machine shown in Fig. 16, the view being taken along lines 18—18 thereof.

Fig. 19 is a section taken along lines 19—19 of Fig. 13.

Fig. 20 is a section taken along lines 20—20 of Fig. 13, illustrating a pair of cutting knives and their associated mechanism for adjusting the same.

Fig. 21 is a transverse section through one set of discharge rolls employed in the machine, the section being taken along lines 21—21 of Fig. 13.

Fig. 22 is a section taken along lines 22—22 of Fig. 16.

In general, the machine of the present invention (see Figs. 1 and 2) consists of a feed table A, an inspection table B, and a cutting and sizing mechanism C.

The fresh asparagus delivered from the field is first cleaned and thereafter deposited upon the feed table A of the machine, which functions to separate the individual spears of the asparagus, to position the same parallel with respect to each other and to advance the spears toward the inspection table B. At the same time, the flower ends of the spears of asparagus are roughly aligned and placed into a predetermined position with respect to the machine.

Thereupon the asparagus is transferred from the feed table A to the inspection table B where the same is inspected and undesired or imperfect spears are manually removed. This inspection table functions to advance the asparagus from the feed table to the cutting and sizing mechanism of the machine and performs an additional or final alignment of the flower ends of the spears of asparagus with respect to the machine.

The aligned and properly positioned spears are subsequently delivered to the cutting and sizing mechanism C of the machine, where they are sized according to their thickness into several grades and cut into desired lengths as required for different packs such as long asparagus, tips or center cuts.

Subsequent to the sizing and cutting of the asparagus the various grades and cuts thereof are separately collected and discharged from the machine and are ready to be blanched and packed into cans for further processing of the same.

Referring now to the specific construction of the machine of the present invention, and especially to Figures 1 to 9, 11, 12 and 14, I designates the frame structure of the machine, which comprises frame units 2, 3 and 4 of the feed table A, inspection table B, and cutting and sizing mechanism C, respectively. The frame unit 2 of the feed table A of the machine consists of longitudinal frame members 6, 7, transverse frame members 8, 9, front legs 11 and rear legs 12.

The frame unit 3 of the inspection table B comprises longitudinal members 16, 17, transverse frame members 18, and supporting legs 19 (see Figs. 1, 2, 6 and 7). The longitudinal frame members 16 and 17 of the frame unit 3 of the inspection table B are secured at their front ends to the frame unit 2 of the feed table A and form an integral structure with the same (see Fig. 1).

The frame unit 4 of the cutting and sizing mechanism C of the machine comprises a plurality of supporting legs 21, 22, 23 and 24 between which longitudinal frame members 26, 27, 28, 29, 30 and transverse frame members 31, 32 and 33 are mounted.

Rotatably mounted within bearings 36 and 37 positioned within the horizontal frame members 6 and 7 of the frame unit 2 are shafts 38 provided with feed rolls 39 fixed to the same for rotation therewith. The shafts 38 and feed rolls 39 extend transversely of the frame unit 2 of the feed table of the machine and the rolls are closely spaced with respect to each other so as to form a continuous feed table over which the asparagus is advanced toward the inspection table B in a manner as will be described later on.

Each of the transverse shafts 38 is provided with a sprocket wheel 41 keyed thereto for rotation therewith, while retaining collars 42 and 43 are employed for maintaining the shafts 38 in proper position within the frame structure 2 of the machine. The feed roll shafts 38 and feed rolls 39 are positioned parallel with respect to each other, so that vegetable receiving valleys are formed between adjacent rolls 39 (see Fig. 4).

The feed rolls 39 are of different lengths so as to form a feed table of gradually reducing width from the charge end 44 thereof toward the discharge end 46 of the same.

Rotatably mounted within bearings 47 and 48 of the horizontal frame members 6 and 7 at the discharge end 46 of the feed table A is a shaft 49 provided with transfer rolls 51 and 52 fixed thereto. Keyed to the shaft 49 is further a sprocket wheel 53 (see Fig. 5), while retaining collars 54 and 56 are employed for maintaining the shaft 49 in proper position within the frame structure 1 of the machine.

Fixed to the legs 12 of the frame structure 2 are bearings 66 and 67, and rotatably mounted therein and extending transversely across the frame structure 1 is a drive shaft 68 provided with sprocket wheels 69, 70 and 71, which are keyed thereto for rotation therewith. Positioned intermediate the legs 12 and secured to the same is a supporting bracket 72 upon which an electric motor 73 is mounted. The electric motor 73 is provided with a gear reduction mechanism 74 comprising a drive shaft 76 provided with a sprocket wheel 77 keyed thereto. Trained around the sprocket wheels 77 and 69 is an endless sprocket chain 78 so that upon operation of the motor 73 shaft 68 and sprocket wheels 69, 70 and 71 will be rotated in the direction as indicated in Fig. 1.

Trained around the sprocket wheels 41, sprocket wheel 53 and 70 is an endless sprocket chain 79 (see Fig. 1) so that upon rotation of the shaft 68 and sprocket wheel 70 the feed rolls 39 and transfer rolls 51 and 52 are rotated in a common direction as indicated by arrows in Fig. 4. Secured to the horizontal frame member 6 by means of cap screws 81 is a cover plate 82 which also functions as a guide plate adapted to retain the sprocket chain 79 in proper engagement with the sprocket wheels 41 and 53.

Positioned intermediate the feed rolls 39 and the horizontal frame member 7 is a gauge bar 86 which is closely spaced with respect to the free ends of the feed rolls 39 and extends in vertical direction a considerable distance above the feed bed formed by the feed rolls of the machine. The gauge bar 86 is provided at its free ends with brackets 87 and 88 slidably supported upon supporting plates 89 and 91 secured to the horizontal frame member 7 in any convenient manner. The brackets 87 and 88 are provided with guide slots 92 and 93 which are angularly disposed with respect to the frame member 7. The guide slot 92 is arranged at a greater angle with respect to the frame member 7 than the guide slot 93 (see Fig. 3). Positioned within the guide slots 92 and 93 and threadedly secured to the supporting plates 89 and 91 are cap screws 94 provided with washers 96 for maintaining the brackets 87 and 88 in proper position with respect to the guide plates 89 and 91. The cap screws 94 are provided with a shoulder 97 adjacent the supporting plates 89 and 91 (see Fig. 5) so that the cap screws may be securely attached to the supporting plates 89 and 91 without tightening the brackets 87 and 88 against the same, whereby a free sliding engagement of the brackets 87 and 88 with the supporting plates 89 and 91 is maintained and the brackets 87 and 88 are properly guided by the cap screws 94 during their movement relative to the same.

Rotatably mounted within a bearing 101 secured to the horizontal frame member 7 is a shaft 102 provided with a crank disc 103 and crank pin 104. Secured to the gauge bar 86 intermediate the brackets 87 and 88 by means of a flange 106 is a pivot pin 107 and pivotally secured to the same and the crank pin 104 is a pitman 108. Retaining nuts 109 and 111 threadedly secured to the pivot pin 107 and crank pin 104, respectively, are provided for maintaining the pitman 108 in proper engagement with the pin 107 and crank pin 104.

Keyed to the shaft 102 is a sprocket wheel 112 and trained around the same and the sprocket wheel 71, previously referred to, is an endless sprocket chain 113 (see Fig. 1) so that upon rotation of the shaft 68 shaft 102, crank disc 103 and crank pin 104 are operated to cause reciprocation of the pitman 108 and gauge bar 86.

Incident to reciprocation of the gauge bar 86 in longitudinal directions with respect to the frame structure 2 and feed rolls 39 of the machine, a transverse reciprocation of the bar 86 will be effected due to the camming action between the cap screws 94 and the slots 92 and 93 of the brackets 87 and 88. Due to the difference in the angular position between the longitudinal slot 92 and slot 93 the transverse reciprocation of the bar 86 will be larger at the feed end 44 of the feed table A than at the discharge end 46 thereof.

From the above it will therefore be seen that upon operation of the motor 73 the feed rolls 39 and transfer rolls 51 and 52 are rotated in a common direction, i. e. in the direction of the arrows shown in Fig. 4, and the gauge bar 86 is reciprocated in longitudinal and transverse directions, so that when a bunch of asparagus is placed upon the charge end of the feed table A with the spears thereof substantially parallel to the feed rolls 39 and the flower ends facing the gauge bar 86, the individual spears of the asparagus are separated and drop into the valley portions formed between the feed rolls 39 so that they are positioned parallel with respect to the feed rolls and advanced in such position from the charge end 44 toward the discharge end 46 of the feed table A.

The conveyor formed by the feed rolls 39 is preferably of the well-known type in which the rolls are so proportioned, spaced and driven that the asparagus is caused to advance only under the urge of additional asparagus delivered to the rolls. In other words, the arrangement is such that the tractive effect of the rolls on a single stalk of asparagus resting in the valley between them is insufficient to automatically advance the stalk into the next valley, but the weight or crowding action of a second stalk delivered into the valley so increases the traction on the first stalk as to cause it to be displaced or crowded over the forward roll of the valley into the next succeeding valley. By this arrangement the rate of advance of the asparagus across the rolls may be closely regulated by regulation of the rate at which it is delivered to the rolls, and also the stalks are caused to be discharged from the conveyor one at a time, whereupon they are transferred by means of the transfer rolls 51 and 52 from the feed table A to the inspection table B.

During the travel of the spears of asparagus from the charge end toward the discharge end of the feed table A the gauge bar 86, which is continuously reciprocated in longitudinal and transverse directions, engages the flower ends of the spears and shifts the spears longitudinally of the feed roll 39 so as to bring the flower ends of all spears into substantial alignment with respect to each other and into a predetermined position with respect to the inspection table B.

Mounted upon the transverse frame members 18 of the frame portion 3 of the machine is a table 121 (see Figs. 1, 2, 6 and 7) provided with a guide slot 122 extending over the full length of the same parallel with respect to the longitudinal frame member 16. Rotatably mounted within bearings 123 secured to the legs 12 of the frame structure 2 of the feed table A of the machine is a transverse shaft 124 which is provided with a sprocket wheel 126 and pulleys 127 and 128, which are keyed to the shaft for rotation therewith. In a similar manner a shaft 131 is rotatably mounted within bearings 132 secured to the legs 21 of the frame unit 4 of the cutting and sizing mechanism C. Keyed to the shaft 131 are belt pulleys 133 and 134 and freely rotatable upon the shaft 131 is further an idler sprocket wheel 136 (see Fig. 12). Retaining collars 137 and 138 fixed to the shaft 131 adjacent the idler sprocket wheel 136 are provided for maintaining the latter in proper position upon said shaft.

Secured to the rear legs 24 of the frame unit 4 of the machine are bearings 151 within which a transverse shaft 152 is rotatably mounted. This shaft carries a sprocket wheel 153 keyed thereto (see Figs. 2 and 11) while idler sprocket wheels 154 and 156 are fixed upon shafts 157 and 158 rotatably mounted within bearings 159 and 161 respectively. The bearings 159 are secured to the lower portion of the rear legs 24 while the bearings 161 are secured to the lower portion of the legs 22 (see Fig. 2).

Trained around the sprocket wheels 126, 153, 154 and 156 is an endless flat-top metal chain 162, the upper run 162a of which is adapted to slide along the upper surface of the table 121 with the bearing portions 163 of the links of the chain traveling within the guide slot 122 of the table 121 so that the chain is properly guided during its travel along the upper surface of the table 121. The edges of the guide slot 122 of the table 121 may be preferably re-enforced with flat iron strips 164 (see Fig. 6) so as to reduce the wear between the table 121 and the flat top chain 162. Trained around the pulleys 127, 133 and 128, 134 are endless rubber conveyor belts 166 and 167, respectively. The upper runs of the conveyor belts 166 and 167 are adapted to travel along the upper surface of the table 121 which functions to support and maintain the same in proper horizontal position.

The upper run of the flat top chain 162 intermediate the table 121 and sprocket wheel 153 is supported by means of a chain guide 191 which consists of an angle iron 192 secured to the legs 21, 22, 23 and 24 of the frame unit 4 of the machine and spaced guide bars 193 and 194 secured to the angle iron 192 in any convenient manner. These spaced guide bars 193 and 194 are so positioned with respect to the flat top chain 162 that the link bearings 163 thereof extend into the guide channel 197 formed by the guide bars 193 and 194 (see Fig. 12) so that the chain is properly supported and guided during its travel along the guide member 191. Therefore, not only the section of the upper run of the flat top chain 162 supported by the table 121 but also the portion thereof supported by the guide member 191 is maintained in proper horizontal position.

Keyed upon the shaft 152 is further a sprocket wheel 198 (see Figs. 2, 11 and 14) which is operatively connected by means of an endless sprocket chain 199 with a sprocket wheel 201 keyed upon a drive shaft 202 of a gear reduction mechanism 203 of an electric motor 204 mounted upon the transverse frame members 31 at the rear end of the machine.

From the above it will therefore be seen that upon operation of the motor 204 and rotation of the shaft 152 the flat top chain 162 and conveyor belts 166 and 167 will be operated to effect travel threof in directions as indicated by arrows in Figs. 2 and 6.

Positioned intermediate the longitudinal frame members 16 and 17 and the table 121 are transverse supporting plates 211 and 212. The plate 211 is adjustably secured to the frame members 16 and 17 by means of cap screws 213 extending through transverse slots 214 (see Fig. 6) which permit an adjustment of the plate in longitudinal directions with respect to the frame structure 3. Rotatably mounted within a vertical bearing 216 secured to the plate 211 is a vertical shaft 217 which carries a pulley 218 keyed thereto. The plate 212 is adjustably secured to the frame members 16 and 17 by means of cap screws 221 extending through longitudinal slots 222 in the plate 212. This plate is further provided with a vertical bearing 223 (see Fig. 9) within which a rotatable vertical shaft 224 is mounted. Keyed to the upper end of the shaft 224 is a pulley 226 and secured to the lower end of the shaft 224 and fixed for rotation therewith is a bevel gear 227 which intermeshes with a bevel gear 228 keyed to a shaft 229 rotatably mounted within bearings 231 and 232 secured to the plate 212. One of the ends of the shaft 229 extends through the horizontal member 17 and carries a sprocket wheel 233. This sprocket wheel 233 is adjustably mounted on the shaft 229 but is fixed for rotation therewith. The pulleys 218 and 226 (see Figs. 6 and 9) are positioned adjacent the table 121 and extend above the conveyor belt 167 in closely spaced relation thereto. Trained around the pulleys 218 and 226 is a gauge belt 236, the run 237 of which is positioned at right angles with respect to the conveyor belt 167 and extends longitudinally thereof in close relationship therewith.

Rotatably mounted on a forward extension 238 of the frame unit 4 of sizing and cutting mechanism C by means of bearings 239 is a rotatable transverse shaft 241 provided with sprocket wheels 242 and 243 which are keyed thereto for rotation therewith. Trained around the sprocket wheels 233 and 243 is an endless sprocket chain 244 adapted to transfer rotation of the shaft 241 to shaft 229 previously referred to. Secured to the legs 24 at the rear end of the machine are bearings 251 within which a transverse shaft 252 is rotatably mounted. Keyed to this shaft are a sprocket wheel 253 and a gear 254 which intermeshes with a gear 256 keyed to shaft 152. Trained around the sprocket wheels 242 and 253 is an endless spike chain 258 provided with parallel rows of spikes 259 and 261 (see Fig. 10). The spike chain 258 is positioned above the flat top chain 162 in alignment therewith in such a manner that the spikes 259 and 261 are closely spaced with respect to the flat top chain 162 and do not touch the same. The spacing between the links of the chains 258 and 162 is somewhat larger than the maximum diameter of the spears of asparagus handled by the machine.

An upper chain guide 262 having a plurality of guide brackets 262a and 262b is positioned intermediate the sprocket wheels 242 and 253 and secured to the legs 21 and 24 of the machine in any convenient manner. This chain guide is adapted to guide the lower run 263 of the spike chain in a proper manner with respect to the flat top chain 162. The guide surface of the upper chain guide 262 is positioned below the pitch diameter of the sprocket wheel 242 and is bent upwardly at 264 (see Fig. 11) for purposes to be described later on.

From the above description of the construction of the inspection table B of the machine and a portion of the sizing and cutting mechanism thereof, it will be apparent that upon operation of the motor 204 shafts 152 and 252 will be rotated in the directions as indicated in Fig. 11, causing travel of the flat top chain 162 and spike chain 258 at the same speed in the directions as indicated by the arrows in Figs. 6, 7 and 11. The upper run 162a of the flat top chain 162 travels along the top surface of the table 121 and the chain guide 191, while the lower run 263 of the spike chain 258 travels parallel to the flat top chain 162 and is supported by the chain guide 262 in spaced relation and proper alignment therewith.

Due to the fact that the sprocket wheel 126 is fixed upon a shaft 124, to which the pulleys 127 and 128 are keyed, the travel of the flat top chain 162 will cause rotation of shaft 124, pulleys 127 and 128, thereby effecting a travel of the conveyor belts 166 and 167 in the directions as indicated by arrows in Fig. 6. The size of the sprocket wheels 126 and 153 and the pulleys 127 and 128 is such that the flat top chain 162 and conveyor belts 166 and 167 travel at the same rate of speed. Furthermore, the gears 254 and 256 and sprocket wheels 253 and 242 are so dimensioned that the spike chain 258 travels at the same rate of speed as the flat top chain 162. The sprocket wheels 243, 233 and the bevel gears 228 and 227 are of such dimensions as to cause travel of the gauge belt 236, which is adjacent the conveyor belt 167, at the same rate of speed as the flat top chain 162 and conveyor belts 166 and 167. The direction of travel of the gauge belt 236 is indicated by arrows in Fig. 6.

It has been previously mentioned herein that the gauge belt pulleys 218 and 226 are rotatably supported by adjustable plates 211 and 212. The adjustment of the plate 211 and pulley 218 in longitudinal directions with respect to the frame structure of the machine is for the purpose of taking up any slack in the gauge belt 236, while the adjustment of the plate 212 and pulley 226 transversely of the frame structure of the machine is for the purpose of adjusting the angular position of the gauge belt 236 with respect to the conveyor belt 167 as desired.

Upon transfer of the individual spears of asparagus from the feed table A to the inspection table B the same are placed upon the flat top chain 162 and conveyor belts 166 and 167 in properly spaced relation and are advanced thereby past the gauge belt 236 toward the cutting and sizing mechanism C of the machine. During the travel of the asparagus through this section the same is inspected by an attendant of the machine who removes defective or undesired spears which are not suitable for canning purposes. While the asparagus passes the gauge belt 236 the flower ends of the spears are engaged by the run 237 of said belt (see Fig. 6), which, due to its slightly angular position with respect to the conveyor belt 167, shifts the spears a slight distance in the direction of their longitudinal axes, i. e., transversely to the conveyor belts 166 and 167 and the flat top chain 162, so as to cause a final alignment of the flower ends of the spears with respect to each other. In other words, the gauge belt 236 performs a final alignment of the flower ends of the asparagus, which have been previously roughly aligned with respect to each other by the action of the gauge bar 86 of the feed table A. During this final alignment the parallel position of the spears with respect to each other is not disturbed.

Thereupon the properly positioned and aligned asparagus is presented by the flat top chain 162 and conveyor belts 166 and 167 to the spike chain 258, the spikes of which penetrate the butt ends of the spears, so that the same are impaled upon said spikes and firmly held in their aligned position with respect to the flat top chain 162 during subsequent travel of the asparagus past the cutting and sizing mechanism of the machine.

The outer peripheral portions of the section of the spike chain 258 engaged by the sprocket wheel 242 move at a greater speed than the lower run 263 of said chain, and for this reason it is desirable to impale the spears of asparagus upon the spikes 259 and 261 at a point substantially vertically below the transverse shaft 241, so that no relative movement of the spears with respect to the flat top chain 162 is effected during impalement thereof by said spikes. To accomplish this the transverse shaft 241 and the sprocket wheel 242 are mounted in such relation with respect to the flat top chain 162 that the spears of asparagus may enter the throat 273 formed between the chain 162 and the spike chain 258 without being engaged by the spikes 259 and 261 until they are substantially vertically below the transverse shaft 241 at a point at which any relative movement between the spike chain 258 and flat top chain 162 has ceased or become entirely negligible. In arranging these parts in the manner as above described the aligned position of the asparagus is not disturbed and the same is properly impaled by the spikes of the chain 258 without damage. Of course, it is apparent that under these conditions the sprocket wheel 242 will not position the spike chain 258 into the finally desired spaced relationship with respect to the flat top chain 162 and for this purpose the upper chain guide 262 has been employed, which is adapted to effect the final positioning of the chains 258 and 162 with respect to each other. To accomplish this the upper chain guide 262 has been positioned below the pitch diameter of the sprocket wheel 242 and provided with an inclined guide portion 264 for guiding the spike chain 258 into proper spaced relationship with respect to the flat top chain 162.

Secured to the lower chain guide 191 and a frame member 281 by means of bolts 279 are a plurality of opposing pairs of bearing members 282 and 283, respectively. The frame member 281 (see Figs. 8, 12 and 14) is positioned intermediate the longitudinal frame members 27 of the frame portion 4 of the machine and extends parallel to the same. This frame member 281 is connected to legs 284 which form a part of the frame structure 4. The legs 284 (see Figs. 12 and 14) are welded to the lower transverse frame members 32 and 33 so that the same are rigidly secured in position within the portion 4 of the frame structure of the machine.

Each bearing member 282 is provided with bearings 291 and 292 and a bearing 293 (see Figs. 11, 16 and 20). The bearing members 283 are all of the same construction and comprise bearings 294, 296 and 297. Rotatably mounted within the bearings 291, 294 and 292, 296 of opposing bearing members 282 and 283 are transverse shafts 298 and 299, respectively. The free ends of each of the transverse shafts 298 extend through the bearings 294 of the bearing members 283 and carry a gear 301 and a sprocket wheel 302 which are both fixed to the shafts 298 for rotation therewith. The free ends of each of the transverse shafts 299 which extend through the bearings 296 of the bearing members 283 carry a gear 303 keyed thereto which intermeshes with the gear 301 previously referred to. Each of the transverse shafts 298 is provided with discharge rolls 304, 306 and 307 fixed thereto, while each of the shafts 299 carries discharge rolls 308, 309 and 311 fixed thereto for rotation therewith. The discharge rolls 304, 306 and 307 are arranged in spaced relation with respect to each other upon the shaft 298, and the discharge rolls 308, 309 and 311 are positioned in spaced relation with respect to each other upon the transverse shaft 299 (see Fig. 13). All of the discharge rolls are made from soft resilient material such as sponge rubber or the like, and the rolls 304, 306 and 307 are positioned in closely spaced aligned relationship with respect to the rolls 308, 309 and 311, respectively. All of these discharge rolls are adjustably mounted upon the shafts 298 and 299, respectively, by means of set screws 300 so that the spacing of the rolls on each shaft may be adjusted in any convenient manner.

If desired the discharge rolls 307 and 311 may be mounted for free rotation on the shafts 298 and 299, respectively. In such case each of these rolls (see Fig. 21) is fixed to a bearing ring 300a rotatably mounted upon a bearing sleeve 300b secured to the shaft 298 or 299, respectively, by means of a set screw 300c. The purpose of such arrangement will be set forth later on.

Keyed upon the shaft 152 previously referred to is a sprocket wheel 316 (see Figs. 8 and 14), and an endless sprocket chain 317 trained around the sprocket wheel 316, the sprocket wheels 302 and idler sprocket wheel 136, rotatably mounted upon shaft 131, is employed to cause rotation of shafts 298 and discharge rolls 304, 306 and 307 in a common direction as indicated by arrows in Figs. 2 and 11. Upon rotation of the shaft 298 the gears 301 keyed thereto are rotated therewith; these gears intermesh with the gears 303 fixed to shafts 299 so that a corresponding rotation of the shafts 299 and discharge rolls 308, 309 and 311 in an opposite direction as indicated in Fig. 11 is effected.

It will therefore be seen from the above description that the transverse shafts 298, 299 are arranged in cooperating pairs, and their discharge rolls 304, 306, 307, and 308, 309, 311 are arranged in cooperating groups forming a plurality of cutting stations D, E, F, G, H and K (see Fig. 8).

Rotatably and slidably mounted within the bearings 293 of each bearing member 282 is a sleeve shaft 321 and rotatably and slidably mounted within each sleeve shaft 321 is a knife supporting shaft 322. Each sleeve shaft is provided with a handle 323 secured to one end thereof, while the other free end of each sleeve shaft 321 (see Figs. 19 and 20) carries a knife 324 which extends upwardly into the space between the discharge rolls 304, 308 and 306, 309 for purposes to be described later on.

The free ends of the knife shafts 322 extending exterior of the frame structure of the machine are provided with an actuating handle 326 (see Fig. 19) while the other ends of the knife shafts 322 are rotatably and slidably supported within the bearings 297 of the bearing members 283 previously referred to. Each knife shaft 322 is provided with a cutting knife 327 extending upwardly into the space between the discharge rolls 306, 309 and 307, 311 (see Figs. 13 and 19).

Secured to one of the horizontal frame members 27 adjacent the lower chain guide member 191 and extending from the frame structure of the machine into the path of movement of each of the actuating arms 323 and 326 are notched bars 328 which are adapted to limit the movement of the arms 323 and 326 in one direction and to maintain the sleeve shafts 321, knives 324 and knife shafts 322, as well as the knives 327 in predetermined positions of transverse adjustment. Abutment bars 329 positioned within the path of each of the arms 323 and 326 are further provided to limit the movement of these arms in an opposite direction and to maintain the sleeve shafts 321, knives 324 and knife shafts 322, as well as knives 327, in inoperative position. The abutment bars 329 are secured to one of the frame members 27 adjacent the chain guide 191 in a manner similar to the notched bars 328 previously referred to.

The knives 324 and 327, a detail of which is shown in Fig. 19, comprise a straight portion 331 and an inclined blade portion 332 provided with a sharp cutting edge 333. When the actuating handles 323 and 326 are swung into engagement with the abutment bars 329 the knives are swung toward the transverse shafts 299 into inoperative position, while upon movement of the actuating handles 323 and 326 in an opposite direction into engagement with the notches of the notched bars 328 the knives are placed in operative or cutting position, in which the blade portions 332 thereof extend in transversely inclined directions into the space between the cooperating discharge rolls 304, 308 and 306, 309, and 306, 309 and 307, 311.

The cutting knives 324 and 327 of each cutting station are therefore spaced with respect to each other, and the straight knife portions 331 thereof are of different length so that the blade portions 332 of adjacent cutting knives are positioned in staggered relation to act successively on each stalk passing downwardly between the rolls of the cutting station. Consequently, when the spears of asparagus are discharged between cooperating discharge rolls and forced past the cutting knives 324 and 327 to effect cutting thereof, any jamming of the portions of the spears between the cutting knives 324 and 327, which would interfere with the free discharge of such portions, is eliminated, due to their successive cutting action.

As stated in the above, the knives 324 and 327 of each cutting station are spaced with respect to each other and their spacing and position with respect to the discharge rolls may be regulated in any desired manner by shifting the sleeve shaft 321 and knife shaft 322 in transverse directions relative to each other, as will be obvious to those skilled in the art. By engaging the actuating arms 323 and 326 with the notches of the notched bars 328 the cutting knives are maintained in any desired relationship with respect to each other and the discharge rolls and are locked in such position.

Positioned intermediate the table 121 and the bearing member 282 of the sizing and cutting station D by means of bolts 343 is a bracket 344 to which a knife bracket 346 is pivotally mounted at 347 (see Fig. 16). In a similar manner knife brackets 348, 349, 351, 352, 353 and 354 are pivotally mounted to the various bearing members 282 by means of pivot pins 356 (see Figs. 11 and 16). The knife brackets 346, 348, 349, 351, 352, 353, 354 are provided with sizing knives 357, 358, 359, 360, 361, 362, 363 respectively, which are removably secured by means of screws 364 to their cooperating brackets in a manner as shown in Fig. 16. All of the sizing knives are positioned in closely spaced relation with respect to the flat top chain 162 and extend predetermined distances above the top surface of the same (see Fig. 12). The sizing knives 357 to 363 inclusive are slightly spaced with respect to each other as shown at 365 in Fig. 16, and the bearing members 282 are each provided with a lug 366 within which a set screw 367 is threadedly mounted, while the bracket 344 is provided with a lug 366a within which a set screw 367a is threadedly received. The set screws 367a and 367 are adapted to engage the knife brackets 346 and 348, 349, 351, 352, 353, 354, respectively, so as to permit pivotal movement and adjustment of the same and the sizing knives carried thereby relative to the flat top chain 162. Lock nuts 368 and 368a are provided for maintaining the set screws 367 and 367a, respectively, in their adjusted positions.

Threadedly secured to the knife brackets of the sizing knives above referred to is a lock screw 369 which extends through arcuate slots 371 and 372 within the bearing members 282 and chain guide 191. In a similar manner (see Fig. 22) a screw 373 is threadedly secured to the knife bracket 346 and extends through arcuate slots 374 and 375 of the bracket 344 and chain guide 191. If it is desired to adjust the sizing knives of the machine, the lock screws 369 and 373 are loosened and the set screws 367 and 367a are manipulated to effect the desired positioning of the sizing knives, and after the adjustment thereof is completed the sizing knives are locked in their adjusted position by tightening the lock screws 369 and 373 (see Fig. 17).

The sizing knives 357 to 363 inclusive are positioned in longitudinal alignment with respect to each other so that when the spears of asparagus held between the flat top chain 162 and the spike chain 258 are advanced over said knives they are cut thereby adjacent their butt ends in such a manner that each succeeding sizing knife enters into the cut formed within each spear by the preceding sizing knife, as clearly illustrated in Fig. 10. The individual spears of asparagus advanced along the sizing knives will be completely severed from their butt ends by one or the other of these knives, depending upon the position of the same with respect to the flat top chain 162 and the thickness of the individual spears.

To accomplish the cutting of the asparagus so as to effect a sizing of the individual spears into grades of different thickness, each knife is provided with a cutting edge which comprises straight knife portions 376, 377 and an inclined knife portion 378 intermediate the same. The knife 357 is of a somewhat different configuration insofar as it comprises only a gradually inclined cutting edge 379.

Depending upon the position of the knife portions 377 and 378 of the sizing blades 358 to 363, inclusive, with respect to the flat top chain 162, each spear of asparagus will be completely cut by one or the other of the sizing blades the position of which with respect to the flat top chain 162 corresponds to the thickness of the particular spear. In a similar manner, the highest point 381 of the blade 357 will determine the thickness of the spears cut by this knife.

The knife 357 is preferably set in such position that the thin spears of asparagus, usually called "culls," which are not desirable for canning, are cut completely through thereby, while the thicker grades of asparagus pass beyond the cull knife 357 and are cut through by the next knife 358 or any of the succeeding knives, depending upon the position of the blades and the thickness of the asparagus. The blades 357 to 363 inclusive are so adjusted that their inclined portions 381 and 378 which perform the final cutting of the spears project gradually greater distances above the flat top chain 162. Therefore the thinnest asparagus is cut through by the cull knife 357 and the thickest asparagus is cut by the last sizing knife 363, while the stalks of intermediate sizes are cut through by one of the intermediate knives 358, 359, 360, 361 or 362 depending upon the size of the stalk.

The highest point of the inclined cutting edges 378 of the sizing knives 358 to 363, inclusive, is positioned substantially above the center of each of the cutting stations D, E, F, G, H and K, so that the individual spears of asparagus of various thickness will be cut from their butt ends at certain predetermined points in their travel and drop upon the discharge rolls of one of the cutting stations D, E, F, G, H and K positioned therebeneath.

Due to the fact that the flower ends of the asparagus spears have been aligned with respect to each other and accurately positioned relative to the flat top chain 162, the sizing knives will cut the asparagus into spears of equal length while the butt ends of the asparagus impaled upon the spikes 259 and 261 of the spike chain 258 are advanced toward the rear end of the machine into engagement with a strike-off finger 391 supported by a bracket 392 secured to the rear legs 24 of the machine. The strike-off finger removes the butt ends from the spikes of the chain 258 and discharges the same into a discharge chute 393 secured to the bracket 392 previously referred to (see Fig. 2).

The thin asparagus spears or "culls" cut off by the cull knife 357 drop downwardly into a discharge chute 394 from which they are discharged from the machine.

It has been mentioned hereinbefore that the asparagus spears cut by the various sizing blades are dropped upon the discharge rolls of the cutting stations D, E, F, G, H and K, and to prevent a longitudinal movement of the cut spears with respect to the discharge rolls of the various cutting stations, a tip guide 396 which extends parallel to the frame member 281 is provided which is secured to the frame member 281 by means of screws 397 and sleeves 398 (see Figs. 8 and 12).

The spears dropped upon the oppositely rotating discharge rolls of the various cutting stations are gripped thereby and discharged in a downward direction between the same so that they are advanced thereby past the cutting knives 324 and 327 previously described. The discharge rolls are made from a soft resilient material, preferably sponge rubber, so that they may flex sufficiently to receive the spears therebetween and to permit the downward discharge thereof while at the same time the spears are firmly held against displacement between the discharge rolls while they are forced past the cutting knives. It should, however, be noted that the discharge rolls are flexible enough to prevent any crushing of the asparagus spears advanced therebetween so that any likelihood of damaging the asparagus is prevented.

While the spears are discharged in a downward direction between the rotating discharge rolls of the cutting sections, the cutting knives 324 and 327 cut the spears into two or three sections, such as center cuts and tips, depending on whether one or two cutting knives are in cutting position. The length of these sections depends upon the position of the cutting knives 324 and 327 with respect to the sizing knives and may be varied in accordance with the requirements of practice in a manner as previously stated herein.

If it is not desired to cut the spears of asparagus within any one of the cutting stations D, E, F, G, H and K the cutting knives 324 and 327 are swung into inoperative position so that the same will not extend into the path of the asparagus discharged between the discharge rolls. If desired, only one of the blades 324 or 327 may be placed into operative position and in this manner any desired number and lengths of cut of the asparagus may be obtained, as will be apparent to those skilled in the art.

The tip ends of the asparagus (see Figs. 12 and 15) are dropped into turn chutes 401 positioned below each cutting station. Each of these turn chutes consists of spaced chute members 402 and 403 provide with inclined faces 404 and 406 respectively (see Fig. 15). The turn chutes 401 are secured to the side portions 407 and 408 of conveyor guides 407a by means of brackets 409 and 411. The conveyor belt guides 407a are attached to the frame members 29 (see Fig. 12) and extend transversely of the frame structure 4 of the machine.

Fixed upon a shaft 412 rotatably mounted within bearings 413 supported by the legs 22, 23, 24 and transverse members 33 of the frame structure 4 of the machine are a plurality of pulleys 414 provided with endless conveyor belts 416 extending transversely from the machine. The front ends of the conveyor belts 416 are supported by idler pulleys, not shown. The upper runs of the transverse conveyor belts 416 are positioned within the belt guides 407a (see Figs. 2, 14 and 15) and pass beneath the turn chutes 401 previously described.

The lower ends of the turn chute members 403 of the turn chutes 401 extend into proximity with the conveyor belts 416 while the lower ends 417 of the chute member 402 are sufficiently spaced from the conveyor belts 416 to permit the passage of the asparagus therebetween.

The rear end of the shaft 412 is provided with a bevel gear 421 which is keyed thereto for rotation therewith and intermeshes with a bevel gear 422 fixed to a transverse shaft 423 rotatably mounted within bearings 424 mounted on the rear legs 24 of the frame structure 4 of the machine. Keyed to the shaft 423 is a sprocket wheel 426 and trained around the same and a sprocket wheel 427 keyed upon shaft 152 is an endless sprocket chain 428, so that upon rotation of the shaft 152, shaft 412 and pulleys 414 are rotated in the direction as indicated in Fig. 14 to thereby cause travel of the conveyor belts 416 in the direction as indicated by arrows 429 in Figs. 8, 13, 14 and 15.

From the above it will therefore be apparent that when the tips of the asparagus designated 431 in Fig. 15 are discharged from the discharge rolls of the cutting stations of the machine the same are engaged by the spaced inclined surfaces 404 and 406 of the turn chutes 401 (see Fig. 15) and are turned 90 degrees and placed upon the conveyor belts 416 in substantially transverse position with respect to the direction of travel of the same.

The belts 416 advance the tips of the asparagus, positioned parallel with respect to each other upon the conveyor belts 416 by the action of the turn chutes 401, from below the turn chutes 401 to a point exterior of the machine where they may be collected in any convenient manner and placed into cans for further treatment thereof. In view of the fact that the tips are all arranged in proper position with their flower ends pointing toward one side of the conveyor belts 416, no manual operation is necessary to turn the spears into proper position so that their placing into the cans is greatly expedited.

Positioned adjacent the turn chutes 401 and extending transversely with respect to the frame structure of the machine are shafts 441, 442, 443, 444 rotatably mounted within bearings 446, 447, 448 and 449, respectively. These bearings are secured to one of the longitudinal frame members 28 by means of bolts 451 (see Figs. 2 and 12). Keyed upon the shafts 441 to 444 inclusive are pulleys 452, 453, 454, 456, respectively, while a gear 457 fixed upon the shaft 442 is arranged in intermeshing relation with respect to a gear 458 fixed upon shaft 443. Trained around the pulleys 452 and 453 is an endless conveyor belt 461 and in a similar manner an endless conveyor belt 462 is trained around the pulleys 454 and 456.

Keyed to the shaft 444 is a sprocket gear 463 and trained around the same and a sprocket wheel 464 fixed upon shaft 152 is an endless sprocket chain 466 so that upon rotation of the shaft 152 in a manner as previously described herein shaft 444 and pulley 456 are rotated in the direction as indicated in Fig. 2, causing a travel of the conveyor belt 462 in the direction of arrow 466a (see Figs. 2 and 11) and rotation of shaft 443 and gear 458 in the direction of arrow 467.

The rotation of gear 458 in the direction above referred to causes rotation of gear 457 and shaft 442 in an opposite direction, thereby effecting travel of the conveyor belt 461 in the direction as indicated by an arrow 468 in Figs. 2 and 11. Positioned between the conveyor belts 461 and 462 and the cutting sections are a plurality of deflecting chutes 471 and 472. (See Figs. 11 and 12.) One chute 471 and 472 is provided for each cutting section D, E, F, G, H, and K (see Fig. 11).

The deflector chutes 471 and 472 are pivotally mounted between transverse frame members 473, 474 and 476 by means of rods 477 and 478 (see Figs. 11 and 12). The deflecting chutes 471 are each provided with an actuating arm 479 which extends through a slot 481 in each of the deflecting chutes 472. Each actuating arm is pivotally secured to its respective deflecting chute 471 at 480 and is provided with a plurality of notches 482 adapted to be engaged with a lock plate 483 mounted between the legs 21, 23 and 24 at one side of the machine (see Figs. 2 and 12).

In a similar manner each of the deflecting chutes 472 is provided with an actuating arm 484 pivotally secured thereto at 486. The actuating arms 484 are provided with a plurality of notches 487 (see Fig. 12) engageable with the lock plate 483 for locking the chutes 472 in adjusted positions.

Upon disengagement of the actuating arms 479 and 484 with the lock plate 483, the actuating arms may be shifted in transverse directions with respect to the frame structure of the machine for adjusting the deflecting chutes 471 and 472 in desired positions with respect to the cutting stations of the machine to collect the cut portions of the asparagus discharged therefrom and direct the same upon the conveyor belts 461 and 462. Due to the position of these deflector chutes parallel to the conveyor belts 461 and 462 and their close spacing with respect to the same, the cut asparagus portions discharged upon the conveyor belts are maintained in separate rows upon the same. The deflecting chutes 471 and 472 are provided with cut out portions 471a and 472a respectively to prevent interference thereof with the sleeve shaft 321 and shaft 322.

It will therefore be seen that the center cuts and soup stock of the asparagus collected from the cutting stations by the deflecting chutes 471 and 472 and deposited thereby in separate rows upon the conveyor belts 461 and 462 are advanced toward discharge chutes 488, 489 and 491, 492, respectively, mounted within the frame structure of the machine adjacent the conveyor belts 461 and 462 in any convenient manner, so that the soup stock and center cuts are separately discharged and may be conveyed from the machine in any well-known manner for further processing of the same.

While the center cuts and soup stock discharged from the cutting sections D, E, F and G, H, K are only separated into two sizes and discharged at the front and rear ends of the sizing and cutting section of the machine, it should be noted that the asparagus tips which are sized into six individual grades by the action of the sizing blades are collected separately so that six different grades of asparagus tips are discharged from the machine. However, it will be apparent that by appropriate adjustment of the sizing blades the number of grades of asparagus obtained from the machine may be reduced in any desired manner.

It has been mentioned hereinbefore that the discharge rolls 307 and 311 may, if desired, be arranged for free rotation relative to shafts 298 and 299. This arrangement assures that the spears remain in substantial horizontal position during their discharge between the discharge rolls of each section even though the front end of the spears adjacent the flower end thereof may contact the discharge rolls 307 and 311 before the remaining portion of the spears contact the discharge rolls 304, 306 and 308, 309. In other words, the mounting of the discharge rolls 307 and 311 for free rotation relative to shafts 298 and 299 permits a proper positioning of the spear in the valley between cooperating sets of discharge rolls before the downward discharge of the spears between the rolls is effected and this assures that the spears are cut at right angles with respect to their longitudinal axes.

If the rolls 307 and 311 are freely rotatable on shafts 298 and 299 as above stated the downward discharge of the asparagus tips after cutting thereof from the remaining portions of the spears is effected by the downward pressure upon the same by the succeeding asparagus tips before complete cutting thereof.

*Operation*

In the following a brief résumé of the complete operation of the entire machine will be given.

Upon operation of the motors 73 and 204 the various mechanisms of the feed table A, inspection table B, and the sizing and cutting section C are actuated in a manner as specifically described hereinbefore.

The asparagus to be treated is placed upon the feed rolls 39 at the extreme left hand end of the machine as viewed in Figs. 1 and 3, with the spears in substantially parallel position with respect to the feed rolls and the flower ends of the spears positioned adjacent the gauge bar 86.

Due to the rotation of the feed rolls in a common direction and their displacement action, as previously described, the spears of asparagus are advanced over the feed table A toward the inspection table B. During their advancement over the feed table A the spears are separated from each other by the action of the feed rolls 39 and positioned in parallel relationship with respect thereto. Incident to the feeding of the asparagus toward the inspection table B the individual spears thereof are shifted longitudinally with respect to the feed rolls 39 by the action of the gauge bar 86, so that a rough or preliminary alignment of the flower ends of the asparagus with respect to each other and the flat top chain 162 is obtained. The spears which have been positioned and aligned in this manner are thereupon transferred in spaced relation by means of the transfer rolls 51 and 52 upon the flat top chain 162 and conveyor belts 166 and 167 of the inspection table B and are advanced thereby toward the sizing and cutting mechanism C of the machine.

During the travel of the individual spears along the inspection table B the gauge belt 236 effects a final alignment of the spears with respect to each other and the flat top chain 162 due to its angular position with respect to the conveyor belt 167. After this final alignment of the spears, they enter into the throat 273 formed between the flat top chain 162 and the spike chain 258 and the butt ends of the spears are impaled upon the spikes 259 and 261 and advanced by the flat top chain 162 and spike chain 258 past the sizing and cutting mechanism C of the machine. The butt ends of the spears are usually tough and not suitable for canning purposes; however, their toughness assists in rigidly holding the spears in aligned position between the flat top chain 162 and spike chain 258.

During the travel of the spears through the sizing and cutting section C the same are first presented to the cull blade 357 and subsequently to the sizing blades 358 to 363, whereby the spears are cut from the butt ends at widely separated points, depending upon the thickness thereof.

The sizing action commences upon engagement of the spears of asparagus with the cull knife 357 which completely cuts through the thinnest spears not desired for canning purposes. These so-called "culls" are thereupon discharged by the cull chute 394 in a manner as previously stated herein. The thicker spears of asparagus continue their travel over the sizing knives toward the rear end of the machine in such a manner that each preceding sizing knife enters into the cut formed by the preceding sizing knife. As stated in the above each of the sizing knives 358 to 363 is provided with straight sharp cutting edges 376 and 377 and an inclined sharp cutting edge 378 disposed intermediate the same. The sizing knives are so adjusted that the inclined cutting edges of the same gradually increase the depth of cut to a maximum at certain predetermined points in the travel of the spears of asparagus, and these points are positioned substantially above the center of the cutting sections D, E, F, G, H, and K. Moreover, each successive sizing knife is arranged at a slightly higher elevation than the preceding one.

It is therefore apparent that the cutting of the individual spears of asparagus by the sizing knives 358 to 363 inclusive is completed at predetermined separated points depending upon the thickness of asparagus to be cut. The spears of the asparagus cut in this manner are therefore separated into grades of different thickness and drop upon the discharge rolls of the cutting stations D, E, F, G, H or K, respectively.

While the butt ends of the asparagus impaled upon the spike chain 258 continue their travel toward the rear end of the machine where they are finally removed from the spikes 259 and 261 by means of the strike-off finger 391 and discharged by means of the chute 393 of the machine, the sized portions of the asparagus are received in the valleys between the cooperating discharge rolls of each of the cutting sections D, E, F, G, H and K and gripped by the rolls and discharged downwardly therebetween.

During the downward travel of the graded asparagus between the discharge rolls of the cutting sections of the machine the individual spears are presented to the action of the cutting knives 324 and 327, and are cut thereby into asparagus tips and center cuts, and are subsequently discharged from the discharge rolls. The cutting knives 324 and 327 may be so adjusted that one or two center cuts and asparagus tips of any desired length are obtained. If desired the cutting knives 324 and 327 and deflecting chutes 271 and 272 may be swung into inoperative position and the spears may be discharged after sizing without further cutting of the same.

The asparagus tips discharged from the discharge rolls of the cutting stations D, E, F, G, H and K drop into the turn chutes 401 while the center cuts are directed upon the conveyor belts 461 and 462, respectively, and are maintained in separate rows upon these belts by the action of the deflecting chutes 471 and 472.

The center cuts deposited upon the conveyor belts 461 and 462 are conveyed thereby in opposite directions from below the cutting stations D, E, F and G, H, K and are discharged into separate chutes 488, 489 and 491, 492 at the front and rear ends of the cutting and sizing section of the machine, respectively.

The asparagus tips discharged into the turn head chutes 401 below each cutting station of the machine are turned and deposited upon the conveyor belts 416 in substantially transverse positions with respect to the same. The belts 416 convey the various grades of asparagus tips from the machine so that the same may be separately collected and packed into cans for further treatment thereof.

In view of the fact that the sizing knives 357 to 363 inclusive, as well as the cutting knives 324, 327 and deflecting chutes 471 and 472 are adjustable in any desired manner, as specifically described in the above, any desired sizing and cutting of the asparagus may be obtained so that the machine is adaptable for universal use in the preparation of asparagus or the like, as will be obvious to those skilled in the art.

All parts of the machine are easily accessible so that the same may be cleaned to maintain the machine in an absolutely sanitary condition.

While we have shown and described a preferred apparatus and a preferred method for carrying out our invention, it will be understood that both are capable of variation and modification, while still employing the principles of our invention. It is to be understood, therefore, that the scope of the invention should be limited only by the scope and proper interpretation of the claims appended hereto.

Having thus described our invention, what we claim as new and desire to protect by Letters Patent is:

1. A machine for grading asparagus comprising a conveyor for moving the spears of asparagus along a predetermined path, means on the conveyor for supporting the butt ends of the asparagus with the free ends thereof extending laterally from said conveyor, a knife having a cutting edge inclined relative to said conveyor and arranged adjacent thereto for cutting the spears transversely of their length with an increasing depth of cut as they move along said path whereby the spears are severed according to their thickness at separated points in their travel along said path, and means at each separate point along said path for receiving the severed spears as they gravitate at said points.

2. A machine for grading asparagus comprising holding means for moving the spears of asparagus along a predetermined path with a uniform portion of the spears protruding beyond said holding means, means for feeding the spears in parallel and spaced relationship to the holding means, a plurality of contiguous knives aligned with their cutting edges in an inclined plane to gradually cut into each spear as it moves along said path for severing the spears transversely of their length according to their thickness at separated points in their travel along said path, and a succession of separate receptacles arranged beneath the protruding spears for receiving the cut spears from the holding means as they gravitate after severance as aforesaid.

3. A machine for grading asparagus comprising holding means for moving the spears of asparagus along a predetermined path, means for feeding the spears in parallel and spaced relationship to the holding means with uniform lengths of spear extending therefrom, an inclined blade arranged parallel to said holding means to engage each spear and cooperating with the holding means for cutting the spears transversely of their length according to their thickness at separated points as they are advanced along said path, and a plurality of receptacles for receiving the cut spears from the holding means according to their point of gravitation for separating the asparagus into groups as determined by their thickness.

4. A machine for grading asparagus comprising holding means for moving the spears of asparagus along a predetermined path with uniform portions of said spears extending laterally therefrom, inclined blade means arranged adjacent the path of movement of said holding means and cooperating with the latter for cutting the spears transversely of their length with an increasing depth of cut for severing the spears of different thickness at separated points during their travel along said path, and means for separately collecting the severed spears at said points as they gravitate from said holding means.

5. A machine for grading asparagus comprising conveyor means for advancing the spears of asparagus along a predetermined path, means for holding the butt end of said asparagus for supporting the spears laterally, means for aligning the spears in side by side and parallel relationship with respect to each other and for feeding the same in a single file to the holding means, a stationary blade graduating in height in proportion to the position of advance of said conveyor and cooperating with the holding means for cutting the spears transversely of their length with an increasing depth of cut to sever the spears of different thickness at separated points as they advance along said path, and means for separately collecting the severed spears at said points.

6. A machine for grading asparagus comprising means for impaling the butt ends of the spears of asparagus and for moving the same with the remainder of the spears protruding free and unsupported from the impaling means, means cooperating with the impaling means for maintaining the butt ends impaled thereon, a plurality of sizing knives comprising inclined blade portions extending with increasing height from below into the path of the free ends of said spears for cutting the free ends from said butt ends with an increasing depth of cut for severing the free ends of the spears of different thickness from their butt ends at separated points to thereby deposit the same at such points whereby the spears are separated into groups of predetermined thickness.

7. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, and an inclined blade fixedly mounted adjacent said conveyor and parallel with respect thereto for severing the free ends of the spears of predetermined thickness from their butt ends at separated points in their travel along said path for separating the severed free ends of the spears from the remaining spears.

8. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, an inclined blade arranged along said predetermined path for severing the free ends of the spears of predetermined thickness from their butt ends at separated points in their travel along said path and for simultaneously separating the severed free ends of the spears from the remaining spears, means at each of said separated points for receiving the severed ends of said spears and for discharging them along a downward path, and a plurality of knives arranged between said receiving means and across the downward path and cooperating with the receiving means for cutting the free ends of the spears into sections of predetermined length.

9. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, means for severing the free ends of the spears of predetermined thickness from their butt ends at separated points in their travel along said path for separating the severed free ends of the spears from the remaining spears, cushion rollers for receiving the severed ends of said spears, means interspersed between siad cushion rollers and cooperating with the latter for cutting the free ends of the spears into portions of predetermined length, and means for separately collecting the portions of said spears at said points.

10. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, means for severing the free ends of the spears of predetermined thickness from their butt ends at separated points in their travel along said path for separating the severed free ends of the spears from the remaining spears, means for receiving the severed ends of said spears, means cooperating with the receiving means for cutting the free ends of the spears into portions of predetermined length, means for separately collecting the portions of said spears at said points, and means for depositing said portions in substantially parallel relation with respect to each other upon said collecting means.

11. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, means for severing the free ends of the spears of predetermined thickness from their butt ends at separated points in their travel along said path for separating the severed free ends of the spears from the remaining spears, means for receiving the severed ends of said spears, means cooperating with the receiving means for cutting the free ends of the spears into portions of predetermined length, means for separately collecting the portions of said spears at said points, and a turn chute positioned intermediate the receiving means and said collecting means for aligning the portions of the spears with respect to each other.

12. A machine for grading asparagus comprising, a conveyor, impaling means on said conveyor, conveying means cooperating with said conveyor for feeding the spears of asparagus thereto, means for operating said conveyor for impaling the butt ends of the spears presented thereto upon said impaling means and for moving the spears with the free ends thereof protruding from the conveyor along a predetermined path, means for severing the free ends of the spears of predetermined thickness from their butt ends at separated points in their travel along said path for separating the severed free ends of the spears from the remaining spears, a plurality of cooperating discharge rolls for receiving the severed ends of the spears at said points, cutting means associated with the discharge rolls for cutting said ends of the spears into portions of predetermined length, a discharge conveyor below said cutting means, a turn chute interposed between the discharge rolls and discharge conveyor, and means for operating said discharge rolls for advancing the free ends of the severed free ends of the spears past said cutting means and for discharging the cut portions thereof into said turn chute, whereby the cut portions of the spears received by said turn chute are deposited upon said discharge conveyor in substantially parallel relation with respect to each other.

13. The method of sizing asparagus comprising advancing spears of asparagus along a predetermined non-vertical plane and in a direction substantially transversely to the axis of the spears, and cutting the spears in a direction away from said plane with a depth of cut increasing proportionate to the distance of travel of said spears, whereby spears of different thickness are completely severed at different points of their travel.

14. The method of sizing asparagus comprising translating spears of asparagus along a predetermined non-vertical plane and in a direction substantially transversely to the axis of the spears, holding the spears with their butt ends against said plane with the remainder of the spears free and unsupported during said translation, and cutting the spears in a direction away from said plane with an increasing depth of cut proportionate to their distance of translation, whereby spears of different diameters are severed and deposited at different points of their travel.

15. The method of sizing asparagus comprising translating spears of asparagus along a predetermined non-vertical plane and in a direction substantially transversely to the axis of the spears, holding the spears with their butt ends against said plane with the remainder of the spears free and unsupported during said translation, cutting the spears in a direction away from said plane and substantially normal to the axis of the spears with an increasing depth of cut proportionate to their distance of translation, whereby the free ends of the spears of different diameters are severed from the butt ends thereof and deposited at different points in the translation of said spears, and separately collecting the free ends of the spears at said points.

16. The method of sizing asparagus comprising advancing spears of asparagus along a predetermined non-vertical plane and in a direction substantially transversely to the axis of the spears, holding the spears with their butt ends against said plane with the blossom ends of the spears free and unsupported during said advancement, cutting the spears in a direction away from said plane with an increasing depth of cut proportionate to their distance of advancement whereby the blossom ends of the spears of different diameters are severed from the butt ends thereof and deposited at different points of their travel, separately collecting the blossom ends of the spears at said points, and cutting the blossom ends collected at each point into portions of predetermined length.

17. The method of sizing asparagus comprising supporting one end of the spears of asparagus with one side of the spears lying in a common non-vertical plane, advancing the spears sidewise while so supported in a predetermined path along said plane, and cutting the spears during their travel with an increasing depth of cut from said plane and substantially normal to the axis of the spears, whereby dependent upon their thickness the spears are completely severed at different points of their travel and the unsupported ends of the severed spears are deposited at said points.

18. The method of sizing asparagus comprising supporting one end of each spear of asparagus with one side thereof lying in a predetermined non-vertical plane, advancing the spears while so supported sidewise in a single file and in substantially parallel relation along said plane, and cutting into the spears from said plane and substantially normal to the axis of the spears with an increasing depth of cut until said spears are severed, whereby according to the thickness of the spears the advancement of the severed unsupported ends thereof ceases at predetermined points.

19. A cutting mechanism for asparagus grading machines comprising a plurality of cooperating pairs of flexible rolls for receiving graded spears of asparagus, and a plurality of cutting blades arranged at predetermined positions between adjacent pairs of rolls to cut said spears transversely into portions of predetermined length as they are advanced between said pairs of cooperating rolls.

20. A machine for grading asparagus comprising a conveyor having means impaling the butt ends of the asparagus for moving the latter along a predetermined path with the spear ends extending laterally from the conveyor, a plurality of receptacles arranged beneath the path of movement of the extending spear ends, a knife arranged adjacent the conveyor and having a cutting edge increasing in altitude in progressive positions along the path of movement of said conveyor for severing the spear ends from the butt ends at various positions along said knife whereby the severed spear ends gravitate into one or another of said receptacles according to the depth of cut required in severing said spear ends.

21. A machine for grading asparagus comprising means for impaling the butt ends of the spears of asparagus and for advancing the same along a predetermined substantially horizontal path with the remainder of the spears protruding free and unsupported from the impaling means, and cutting means arranged parallel to said path and having a cutting edge extending from below upwardly into said path and increasing in height in proportion to positions of advance along said path for cutting the spears transversely of their length with an increasing depth of cut to sever the free ends of the spears from the butt ends at successive positions along said path whereby the depth of cut completely severing each spear determines the position along said path at which the free end of a particular spear will drop.

22. A machine for grading asparagus comprising means for aligning the spears of asparagus in side by side and parallel relation, means for impaling the butt ends of the spears and for moving the same along a predetermined substantially horizontal path with the remainder of the spears protruding free and unsupported from the impaling means, and a knife blade extending from below upwardly into said path and having a cutting edge graduated in height relative to said path for cutting the spears transversely of their length with an increasing depth of cut whereby to simultaneously sever the free ends of the spears from the butt ends and determine the point along said blade at which a particular spear will drop.

23. A machine for grading asparagus comprising means for moving the spears of asparagus along a predetermined substantially horizontal path with one end of each of said spears protruding from said moving means, and an inclined cutter adjacent said moving means and projecting from below upwardly into the path of the spears with progressively increasing height for cutting the spears transversely of their length to predetermined length with an increasing depth of cut during the progress of the asparagus along said path whereby the spears are severed according to their thickness at separated points in their travel along said path.

24. A machine for grading asparagus comprising means for holding the spears of asparagus by their butt ends with the remainder of the spears protruding free and unsupported therefrom and for advancing the spears along a predetermined non-vertical path, a stationary knife cooperating with the holding means for cutting the spears in a direction away from said path transversely of their length with increasing depth of cut during their progress along said path for severing the spears of different thickness at separated points during their travel along said path and for causing the free and unsupported ends of the spears to drop at said points, means at each of said separate points for receiving and cutting the free ends of the spears into portions of predetermined length, and means for separately collecting the portions of the spears.

25. A machine for grading asparagus comprising means for holding the spears of asparagus by their butt ends with the free ends of the spears suspended thereby and for moving the spears along a predetermined substantially horizontal path, means for aligning the spears in side by side and parallel relation with respect to each other and for feeding the same in a single file to the holding means, a blade inclined in the direction of travel of the spears and extending from below upwardly into the path of the spears for cutting the spears transversely of their length with increasing depth of cut to thereby sever the free ends of spears of different thickness from their butt ends at separated points during their travel along said path, a plurality of tangentially disposed rollers arranged below the path at said separated points for receiving the severed free ends of the spears as they gravitate at said points, and a knife arranged transversely of the tangential plane between said discharge rollers for cutting the severed free ends of the spears into portions of predetermined length.

26. A machine for grading asparagus comprising holding means for advancing the spears of asparagus along a predetermined non-vertical path with the blossom ends of the spears projecting free and unsupported from the holding means, means for aligning the spears in longitudinal and transverse directions with respect to the holding means, means for feeding the aligned spears to the holding means, and a stationary blade arranged parallel to said holding means and having a plurality of cutting edges graduated in height for cutting the spears of different thickness in a direction away from said path transversely of their length at separated points during their travel along said path whereby the severed blossom ends of the spears are separated from the remainder of the spears and are deposited at said points.

27. A machine for grading asparagus comprising means for holding the spears of asparagus by their butt ends and for moving them side by side in a horizontal plane along a predetermined path with the remainder of the spears protruding free and unsupported from the holding means, and a plurality of stationary sizing knives adjacent said holding means and extending upwardly from below said plane at graduated elevations with respect thereto into the path of the free ends of said spears for severing the free ends of the spears of different thickness from their butt ends at separated points in their travel along said path whereby the severed free ends of the spears are dropped and deposited at such points.

28. A machine for cutting asparagus comprising means for moving the individual spears of asparagus in a single file along a predetermined substantially horizontal path, and a knife arranged along and extending from below upwardly into said predetermined path and having a plurality of blade portions graduated in height at successive positions along said predetermined path for cutting the spears of asparagus in their travel along said path to uniform length.

29. A machine for grading asparagus comprising means for impaling the butt ends of the spears of asparagus and for moving the same in a single file along a predetermined non-vertical path with the other ends of the spears protruding free and unsupported from the impaling means, and a plurality of knives arranged in longitudinal alignment along said path with the blade portions thereof presenting an inclined cutting edge extending from below upwardly into the path of the free ends of the spears for simultaneously cutting and grading the free ends of the spears at predetermined points in their travel along said path to thereby separate the same from the remaining spears.

30. A machine for grading asparagus comprising means for holding the spears of asparagus by their butt ends and for moving spears with the remainder thereof free and unsupported along a predetermined non-vertical path, and cutting means adjacent the holding means having a cutting edge inclined in the direction of travel of the spears and projecting upwardly into said path with increasing height for cutting the free ends of the spears of a given thickness from their butt ends at a predetermined point in their travel along said path.

31. A machine for grading asparagus comprising means for holding and advancing the spears of asparagus in a single file along a predetermined non-vertical path with a portion of each spear free and unsupported by the holding means, and means for cutting each spear in a direction away from said path and transversely of its length at the unsupported portion thereof with a progressively increasing depth of cut whereby each spear is completely severed at a point of its travel where the depth of cut of the cutting means corresponds to the diameter of the spear.

32. The method of sizing asparagus comprising advancing the spears of asparagus along a predetermined non-vertical plane and in a direction substantially transversely to the axis of the spears, and cutting the spears during their travel with an increasing depth of cut in a direction away from said plane and substantially normal to the axis of the spears, whereby dependent upon their thickness the spears are completely severed at different points of their travel.

33. The method of sizing asparagus comprising advancing spears of asparagus along a predetermined non-vertical plane and in a direction substantially transversely to the axis of the spears, holding the spears with their butt ends against said plane and the blossom ends free and unsupported during said advancement, cutting the spears in a direction away from said plane and substantially normal to the axis of the spears with an increasing depth of cut proportionate to their distance of advancement, whereby the blossom ends of the spears of different diameters are severed from the butt ends thereof and deposited at different points of their travel, separately collecting the blossom ends of the spears at said points, cutting the blossom ends collected at each point into center cuts and tips, and separately collecting the center cuts and tips at each point.

34. A method of grading asparagus comprising advancing the spears of asparagus along a predetermined non-vertical path with the blossom ends of the spears free and unsupported, gradually cutting into the spears in a direction away from said path and substantially normal to the axis of the spears with a depth of cut increasing in proportion to the distance the asparagus is advanced along the path to completely sever the blossom ends of the spears from the remaining portions thereof at successive positions of advance along said path, and collecting the severed blossom ends at the successive positions along the path to separate the same according to size.

35. The method of grading asparagus comprising advancing the asparagus along a predetermined non-vertical path with one peripheral edge of each stalk in a common plane, and cutting into the asparagus from said plane upwardly and in a direction substantially normal to the axis of the spears with an increasing depth of cut proportionate to the distance advanced along the path to sever the asparagus at sucessive positions along the path according to the depth of cut required to completely sever the same as determined by the size of the asparagus.

36. An asparagus grader comprising means for holding the spears of asparagus with one end thereof unsupported and for advancing the asparagus in a predetermined substantially horizontal path, and a blade disposed in a substantially vertical plane and having an inclined cutting edge, said blade being arranged to engage each individual stalk of asparagus from below as it is advanced along said path for simultaneously cutting and grading the asparagus according to size.

37. A machine for grading asparagus comprising means for impaling the butt ends of the spears of asparagus and for moving the same along a predetermined substantially horizontal path with the remainder of the spears protruding from the impaling means, and a knife disposed in a substantially vertical plane and arranged along said path adjacent said impaling means, said knife having an inclined cutting edge extending from below upwardy into said path for cutting the protruding ends of the spears of a given thickness from their butt ends at a predetermined point of their travel along said inclined cutting edge.

38. The method of sizing asparagus comprising advancing the spears of asparagus along a predetermined non-vertical plane and in a direction substantially normal to the axis of the spears, and cutting the spears during their travel by a cut of increasing depth beginning adjacent said plane and terminating remotely thereof whereby dependent upon their thickness the spears are completely severed at different points of their travel.

ALBERT R. THOMPSON.
RICHARD D. FOX.